(12) United States Patent
Uehara et al.

(10) Patent No.: US 8,025,814 B2
(45) Date of Patent: Sep. 27, 2011

(54) RESIN COMPOSITION AND MOLDED ARTICLE USING THE SAME

(75) Inventors: Tomoko Uehara, Tsukuba (JP); Tomoya Hosoda, Tsukuba (JP); Satoshi Okamoto, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 130 days.

(21) Appl. No.: 12/487,272

(22) Filed: Jun. 18, 2009

(65) Prior Publication Data

US 2009/0315783 A1 Dec. 24, 2009

(30) Foreign Application Priority Data

Jun. 23, 2008 (JP) ................. 2008-163044

(51) Int. Cl.
 *C09K 19/52* (2006.01)
 *C09K 19/06* (2006.01)
 *C09K 19/00* (2006.01)
 *H01L 35/00* (2006.01)
 *H01Q 1/36* (2006.01)

(52) U.S. Cl. .................. 252/299.01; 252/299.6; 430/20; 428/1.1; 343/700 R

(58) Field of Classification Search ............. 252/299.01, 252/299.6; 343/700 R; 428/1.1; 430/20
See application file for complete search history.

(56) References Cited

U.S. PATENT DOCUMENTS

| 7,014,921 | B2 * | 3/2006 | Okamoto et al. ............. 428/480 |
| 2005/0113555 | A1 | 5/2005 | Okamoto et al. |
| 2008/0048150 | A1 * | 2/2008 | Hosoda et al. ............. 252/299.5 |

FOREIGN PATENT DOCUMENTS

| JP | 2002-114894 A | 4/2002 |
| JP | 2004-161953 A | 6/2004 |
| JP | 2004-256673 A | 9/2004 |
| JP | 2006-233118 A | 9/2009 |
| WO | WO 2009/072641 A1 | 6/2009 |

* cited by examiner

*Primary Examiner* — Geraldina Visconti
(74) *Attorney, Agent, or Firm* — Foley & Lardner LLP

(57) ABSTRACT

The present invention provides a resin composition comprising a liquid crystal polymer and a filler comprising a composite oxide containing Ba, Sm, and Ti. The resin composition can provide a molded article which has excellent dielectric characteristics and is excellent in dimension stability.

13 Claims, No Drawings

RESIN COMPOSITION AND MOLDED ARTICLE USING THE SAME

BACKGROUND OF THE INVENTION

1. Field of the Invention

This invention relates to a resin composition which can provide a molded article excellent in dielectric characteristics and dimension stability, and to a molded article obtained therefrom.

2. Description of Related Art

Due to the development in wireless information communication network represented by mobile communication (such as satellite communication appliance, mobile phone, and PHS, wireless LAN system), or automotive communication (such as ETC system and GPS for highways), a demand for an antenna to be used for information communication appliances has been rapidly increasing. Since there is a demand for reductions in size, weight, and cost of such an antenna, a molded article obtained from a thermoplastic resin is used in a base for an antenna (hereinafter, referred to as "antenna base").

For producing the antenna, it is necessary to form a conductive layer to be used as an electrode on the antenna base. Since soldering, metal plating, or the like is employed as a means for forming the electrode, the antenna base is required to have durability that prevents the properties thereof from being impaired by the electrode formation means. In order to satisfy such characteristics, liquid crystal polyester has been attracted attention as a thermoplastic resin to be used for producing an antenna base. Since the liquid crystal polyester has both of high level of heat resistance and processability and is of low water absorption, the liquid crystal polyester improves not only the durability related to the antenna production but also durability during temporal use of the antenna.

On the other hand, in the above-mentioned information communication appliances, due to the achievement of higher density of information, conformity to information communication using electromagnetic wave in higher frequency band has been considered, and because of the consideration, there is an increasing demand for an antenna base that is excellent in dielectric characteristics.

As the dielectric characteristics required for the antenna base, high dielectric constant (characteristic of being highly dielectric) and low dielectric loss tangent with respect to electromagnetic wave in higher frequency band are of importance. The highly dielectric antenna base is not considerably reduced in antenna characteristics even when the antenna is relatively small, and the low dielectric loss tangent antenna base has a tendency to be increased in antenna gain. In order to obtain the highly dielectric antenna base, a method of using a highly dielectric material as a filler (hereinafter, referred to as "highly dielectric material filler") and obtaining an antenna base from a resin composition containing the highly dielectric material filler and liquid crystal polyester has been employed. For example, a resin composition containing liquid crystal polyester and a ceramic powder is proposed as a resin composition which can provide a molded article having highly dielectric characteristics and low dielectric loss tangent (see, JP-A-2006-233118).

SUMMARY OF THE INVENTION

Incidentally, although a liquid crystal polymer exhibits excellent fluidity when its rigid molecular chain is oriented in a direction parallel to a flow direction (hereinafter sometimes referred to as "MD direction"), in contrast, a liquid crystal polymer has a characteristic that a mold shrinkage factor in a direction (hereinafter sometimes referred to as "TD direction") orthogonal to the orientation direction is increased. In a case where the shrinkage factor in the TD direction is larger when melt-molding the liquid crystal polymer, a molded article to be obtained easily causes to generate a difference in property between the MD direction and the TD direction. In the case of producing a component part by providing a metal layer on such a molded article, there has been a tendency that a large warping is generated on the component part due to thermal expansion difference between the metal layer and the molded article made from the liquid crystal polymer, and there has been a problem that in a resin composition having particularly large mold shrinkage factor in the TD direction, it is relatively difficult to obtain a molded article having desired dimensions and therefore, it is inferior in dimension stability.

The resin composition disclosed in JP-A-2006-233118 which can provide a molded article having excellent dielectric characteristics including remarkably small dielectric loss tangent but is not necessarily satisfactory in terms of a reduction in mold shrinkage factor in the TD direction in molding, and there has been a demand for improvement in dimension stability from the viewpoints of suppression of warping generated when producing an antenna from the molded article and obtaining a molded article having desired dimensions.

Further, it is also known that a film with a reduced anisotropy can be obtained by casting a solution comprising an aromatic liquid crystal polymer and a solvent on a substrate and then removing the solvent (see, JP-A-2002-114894), but the film still requires improvements in dielectric characteristics and much more enhancement in dimension stability.

Accordingly, one of objects of the present invention is to provide a resin composition which can provide a molded article having excellent dielectric characteristics, particularly, enormously small dielectric loss tangent, and being excellent in dimension stability as well as a molded article using the resin composition.

The present inventors have conducted extensive research to accomplish this invention.

The present invention provides a resin composition comprising (A) a liquid crystal polymer and (B) a filler comprising a composite oxide containing Ba, Sm, and Ti. Also, the present invention provides a molded article and a film, both of which are obtained from the resin composition. Further, the present invention provides an antenna comprising an electrode and the molded article or the film.

According to the present invention, a molded article (including film) having excellent dielectric characteristics, particularly, remarkably small dielectric loss tangent, can be obtained. The molded article is excellent in dimension stability.

Since a melt-molded article obtained from the resin composition has a small mold shrinkage factor in the TD direction, the molded article is excellent in dimension stability. In addition, the resin composition has advantages such that the resin composition easily provides a molded article having a desired dimension. Further, in producing a component part by placing the molded article (including film) on a metal layer, warping of the component part can be sufficiently suppressed. Moreover, a liquid composition made from the resin composition and a solvent is capable of providing a film that is excellent in dimension stability as a molded article by coating the liquid composition on a substrate and removing the solvent. Therefore, the resin composition of the present invention is particularly useful for producing an antenna base.

DETAILED DESCRIPTION OF THE PREFERRED EMBODIMENTS

Hereinafter, a preferred embodiment of the present invention will be described.

<Component (A) Liquid Crystal Polymer>

A liquid crystal polymer to be used as a component (A) is a so-called thermotropic liquid crystal polymer, which has a property of forming a molten article exhibiting optical anisotropy at 450° C. or less. Specific examples thereof include:

(1) a liquid crystal polymer obtainable by polymerizing a combination of aromatic hydroxycarboxylic acid, aromatic dicarboxylic acid, and aromatic diol;

(2) a liquid crystal polymer obtainable by polymerizing a plurality of types of aromatic hydroxycarboxylic acids;

(3) a liquid crystal polymer obtainable by polymerizing a combination of aromatic dicarboxylic acid and aromatic diol;

(4) a liquid crystal polymer obtainable by reacting crystalline polyester such as polyethylene terephthalate with aromatic hydroxycarboxylic acid; and the like. In the above-described (1) to (4), polyesteramide obtainable by replacing a part of aromatic hydroxycarboxylic acid with aromatic aminocarboxylic acid, polyesteramide obtainable by substituting a part of aromatic diol with aromatic amine and/or aromatic diamine having phenolic hydroxide groups may also be used as the component (A).

In production of each of the liquid crystal polymers of (1) to (4), an ester-forming derivative of aromatic hydroxycarboxylic acid, aromatic dicarboxylic acid or aromatic diol may be used in place of aromatic hydroxycarboxylic acid, aromatic dicarboxylic acid, or aromatic diol. When such an ester-forming derivative is used, the production of the liquid crystal polymer can be facilitated. The liquid crystal polymer can be produced by forming aromatic amide carboxylic acid into an ester-forming/amide-forming derivative in the case of replacing a part of aromatic hydroxycarboxylic acid with aromatic aminocarboxylic acid. Similarly, in the case of replacing a part of aromatic diol with aromatic amine and/or aromatic diamine having a phenolic hydroxide group, the liquid crystal polymer can be produced by preparing aromatic amine and/or aromatic diamine having a phenolic hydroxide group into an ester-forming/amide-forming derivative.

Here, the ester-forming derivative and the amide-forming derivative will be briefly described. When aromatic hydroxycarboxylic acid, aromatic aminocarboxylic acid and aromatic dicarboxylic acid (each having a carboxyl group in the molecule) is used, the examples of the ester-forming derivative include compounds (such as acid halides and acid anhydrides) that have been obtained by converting the carboxyl group into a highly reactive group, those obtained by forming ester by the carboxylic group with such as alcohols or ethyleneglycol so as to generate polyester or polyesteramide by an ester exchange reaction or amide exchange reaction, and the like.

In the case of aromatic hydroxycarboxylic acid and aromatic diol having a phenolic hydroxide group in the molecule, examples of the ester-forming derivative include those in which the phenolic hydroxide group forms an ester with lower carboxylic acids so that the phenolic hydroxide group generates polyester by an ester exchange reaction and the like.

Similarly, in the case of aromatic aminocarboxylic acid having an amino group (particularly, group represented by —NH$_2$) in the molecule, aromatic amine and aromatic diamine having a phenolic hydroxide group, examples of the amide-forming derivative include those obtained by converting the amino group into a reaction group easily forms an amide bonding.

Further, to a degree not inhibiting ester-forming property and amide-forming property, aromatic hydroxycarboxylic acid, aromatic dicarboxylic acid, or aromatic diol as described above may have a chlorine atom, a halogen atom such as a fluorine atom, an alkyl group such as a methyl group and an ethyl group, or an aryl group such as a phenyl group in an aromatic ring as a substitution group. Similarly, aromatic aminocarboxylic acid, and aromatic amine or aromatic diamine having a phenolic hydroxide group may have a halogen atom, an alkyl group, or an aryl group in an aromatic ring as a substitution group. Similarly, to a degree not inhibiting ester-forming property and amide-forming property, aromatic aminocarboxylic acid, and aromatic amine and aromatic diamine having phenolic hydroxide group may also have a halogen atom, an alkyl group, or an aryl group in an aromatic ring as a substitution group.

Examples of a structural unit forming the liquid crystal polymer include the following ones.

A structural unit derived from aromatic hydroxycarboxylic acid:

(A$_1$)

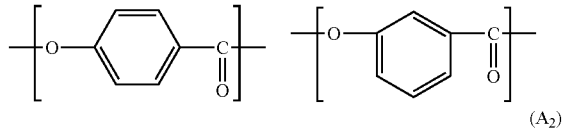

(A$_2$)

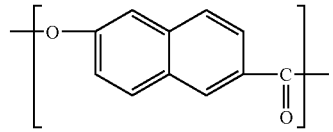

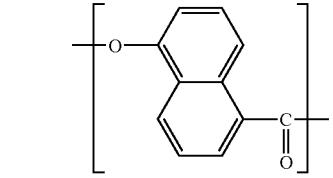

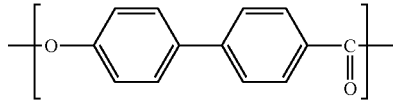

The above structural unit may have a halogen atom, an alkyl group, or an aryl group as a substitution group.

A structural unit derived from aromatic dicarboxylic acid:

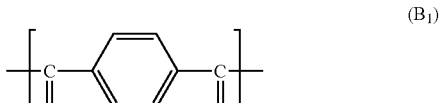

(B$_1$)

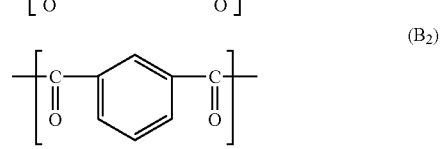

(B$_2$)

-continued

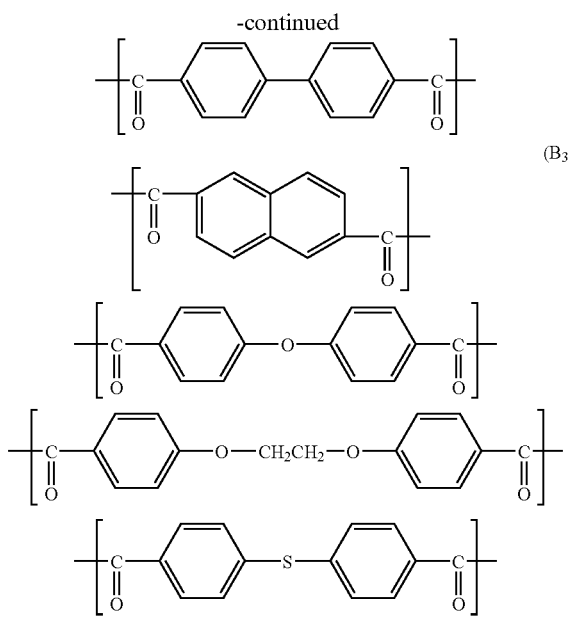

The above structural unit may have a halogen atom, an alkyl group, or an aryl group as a substitution group.

A structural unit derived from aromatic diol:

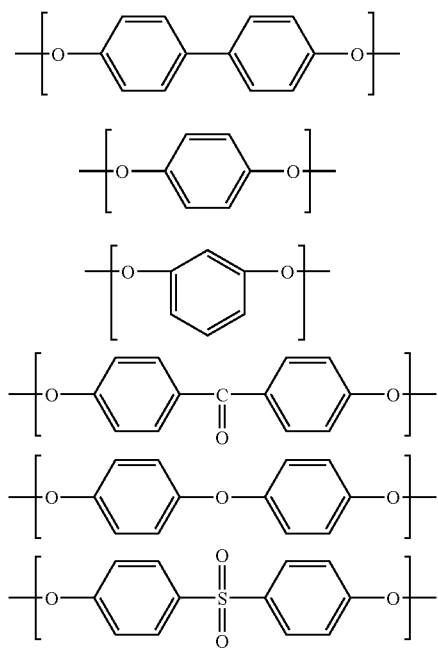

The above structural unit may have a halogen atom, an alkyl group, or an aryl group as a substitution group.

In a case where the liquid crystal polymer is polyesteramide, a structural unit derived from aromatic aminocarboxylic acid, a structural unit derived from aromatic amine having a phenolic hydroxide group, or a structural unit derived from aromatic diamine described below is contained. Liquid crystal polyesteramide containing such a structural unit has a tendency that solubility to a solvent is much more excellent while maintaining sufficient liquid crystal property.

A structural unit derived from aromatic aminocarboxylic acid:

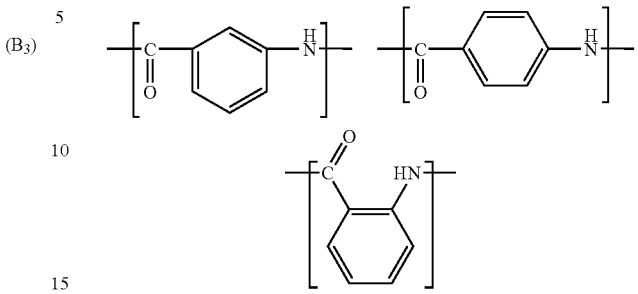

The above structural unit may have a halogen atom, an alkyl group, or an aryl group as a substitution group.

A structural unit derived from aromatic amine having a phenolic hydroxide group:

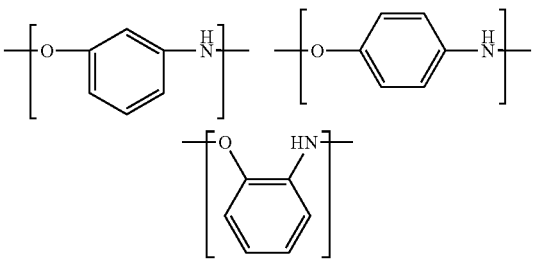

The above structural unit may have a halogen atom, an alkyl group, or an aryl group as a substitution group.

A structural unit derived from aromatic diamine:

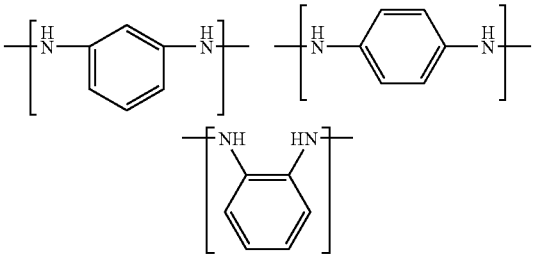

The above structural unit may have a halogen atom, an alkyl group, or an aryl group as a substitution group.

A flow initiation temperature of the liquid crystal polymer to be used as the component (A) may be preferably 270° C. to 400° C., and more preferably 300° C. to 380° C. When a liquid crystal polymer having a flow initiation temperature of less than 270° C. is used as the component (A), a molded article to be obtained can easily be deformed under a high temperature environment, or a blister (abnormal swelling) can easily be caused due to soldering processing and the like in some cases. On the other hand, in the case of a liquid crystal polymer having a flow initiation temperature exceeding 400° C., a melt-processing temperature is increased to make it relatively difficult to produce a molded article. Further, when processing is performed at a melt-processing temperature of 400° C. or more, there is a drawback that the liquid crystal polymer itself can easily be deteriorated by heat.

As used herein, "flow initiation temperature" means a temperature at which a melt viscosity becomes 4800 Pa·sec when a heat-molten article is extruded by using a capillary rheometer with a nozzle having an inner diameter of 1 mm and a length of 10 mm from a nozzle attached to a die while heating at a heating rate of 4° C/min under a load of 9.8 MPa, and the flow initiation temperature is well known in the art as an index indicating a molecular weight of liquid crystal polyester (see "Liquid Crystalline Polymer Synthesis, Molding, and Application" edited by Naoyuki Koide, pages 95 to 105, published by CMC on Jun. 5, 1987).

The present inventors have found that a liquid crystal polymer containing a specific amount or more of 2,6-naphthalenediyl groups as aromatic groups is effective for achieving excellent dielectric characteristics, particularly, low dielectric loss tangent, by a synergetic effect with a highly dielectric filler. That is, in a case where a liquid crystal polymer contains 30 mol% or more of 2,6-naphthalenediyl groups as the component (A) when all of divalent aromatic groups forming the liquid crystal polymer is 100 mol%, such a liquid crystal polymer is effective for particularly reducing the dielectric loss tangent. A liquid crystal polymer containing 40 mol% or more of 2,6-naphthalenediyl groups is more preferred, and a liquid crystal polymer containing 50 mol% or more of 2,6-naphthalenediyl groups is still more preferred.

Examples of the liquid crystal polymer to be used as the component (A) include a polyester in which divalent aromatic groups are bonded by ester bonding; and polyesteramide in which divalent aromatic groups are bonded by ester bonding and amide bonding. In the viewpoint of further improving the dimensional stability of a molded article to be obtained, polyester in which divalent aromatic groups are bonded by ester bonding is suitably used. As described above, it is preferable to use a polyester having 2,6-naphthalenediyl groups as the divalent aromatic groups, and it is more preferable to use the liquid crystal polyester which has a structural unit represented by formula (i) (hereinafter, referred to as "structural unit (i)"), a structural unit represented by formula (ii) (hereinafter, referred to as "structural unit (ii)"), and a structural unit represented by formula (iii) (hereinafter, referred to as "structural unit (iii)"), and which contains 30 mol % or more of the 2,6-naphthalenediyl groups when a sum of a divalent aromatic group represented by $Ar_1$, a divalent aromatic group represented by $Ar_2$ and a divalent aromatic group represented by $Ar_3$ is 100 mol %.

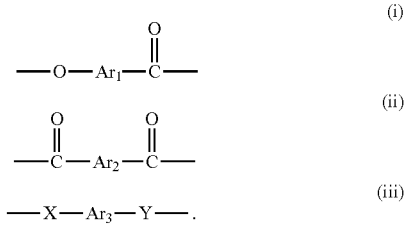

In the above formulas, $Ar_1$ represents a divalent aromatic group selected from the group consisting of a 2,6-naphthalenediyl group, a 1,4-phenylene group, and a 4,4'-biphenylene group. $Ar_2$ and $Ar_3$ each independently represents a divalent aromatic group selected from the group consisting of a 2,6-naphthalenediyl group, a 1,4-phenylene group, a 1,3-phenylene group, and a 4,4'-biphenylene group, and X and Y each independently represents O or NH. In each of the aromatic groups represented by $Ar_1$, $Ar_2$, and $Ar_3$, a part of hydrogen atoms bonded to an aromatic ring may be substituted with a halogen atom, an alkyl group having 1 to 10 carbon atoms or an aryl group having 6 to 20 carbon atoms.

The liquid crystal polyester in which the molar ratios of the structural unit (i), the structural unit (ii), and the structural unit (iii) based on the sum of the entire structural units (copolymerization ratio) are within the above-specified ranges is preferred since it exhibits high level of liquid crystallinity and further can be molten at a practical temperature in addition to the capability of reducing the dielectric loss tangent, thereby facilitating the melt-molding.

The liquid crystal polyester in which the molar ratios of the structural unit (i), the structural unit (ii), and the structural unit (iii) based on the sum of the entire structural units (copolymerization ratio) are within the above-specified ranges is preferred since it exhibits high level of liquid crystallinity and further can be molten at a practical temperature in addition to the capability of reducing the dielectric tangent, thereby facilitating the melt-molding.

The liquid crystal polymer may be preferably a wholly aromatic liquid crystal polymer from the viewpoint of achieving higher heat resistance. Therefore, those not having any structural unit other than the structural unit (i), the structural unit (ii), and the structural unit (iii) are preferred, and the molar ratio of the sum of structural units (ii) and the molar ratio of the sum of structural units (iii) are substantially equal to each other based on the sum of the entire structural units.

The molar ratio of the sum of structural units (i) based on the sum of the entire structural units may be more preferably 40 to 70 mol %, and particularly preferably 45 to 65 mol %.

On the other hand, each of the molar ratio of the sum of structural units (ii) and the molar ratio of the sum of structural units (iii) based on the sum of the entire structural units may be more preferably 15 to 30 mol %, and particularly preferably 17.5 to 27.5 mol %.

The structural unit (i) is a structural unit derived from aromatic hydroxycarboxylic acid, and examples of a monomer deriving the structural unit (i) include 2-hydroxy-6-naphthoic acid, p-hydroxybenzoic acid, and 4-(4-hydroxyphenyl)benzoic acid. Further, a monomer obtainable by substituting a part of hydrogen atoms bonded to a benzene ring or a naphthalene ring of each of the above monomers with a halogen atom, an alkyl group having 1 to 10 carbon atoms, or an aryl group having 6 to 20 carbon atoms may also be used. Among these, the monomer deriving a structural unit having a 2,6-naphthalenediyl group is 2-hydroxy-6-naphthoeic acid.

The structural unit (ii) is a structural unit derived from aromatic dicarboxylic acid, and examples of a monomer deriving the structural unit (ii) include 2,6-naphthalenedicarboxylic acid, terephthalic acid, isophthalic acid, and biphenyl-4,4'-dicarboxylic acid. Further, a monomer obtainable by substituting a part of hydrogen atoms bonded to a benzene ring or a naphthalene ring of each of the above monomers with a halogen atom, an alkyl group having 1 to 10 carbon atoms, or an aryl group having 6 to 20 carbon atoms may also be used. Among these, the monomer deriving a structural unit having a 2,6-naphthalenediyl group is 2,6-naphthalenedicarboxylic acid.

The structural unit (iii) is a structural unit derived from aromatic diol, and examples of a monomer deriving the structural unit (iii) include 2,6-naphthalenediol, hydroquinone, resorcin, and 4,4'-dihydroxybiphenyl. Further, a monomer obtainable by substituting a part of hydrogen atoms bonded to a benzene ring or a naphthalene ring of each of the above monomers with a halogen atom, an alkyl group having 1 to 10 carbon atoms, or an aryl group having 6 to 20 carbon atoms may also be used. Among these, the monomer deriving a structural unit having a 2,6-naphthalenediyl group is 2,6-naphthalenediol.

Various known methods can be used for producing a liquid crystal polymer, and the production method disclosed in JP-A-2004-256673 is suitably employed due to its simple operation.

As a brief description for the production disclosed in the publication, acylated substances (aromatic hydroxycarboxylic acid acylated substance and aromatic diol acylated substance) are obtained by mixing a mixture of aromatic hydroxycarboxylic acid, aromatic diol, and aromatic dicarboxylic acid with an fatty acid anhydride and acylating aromatic hydroxycarboxylic acid and a phenolic hydroxide group of aromatic diol by the fatty acid anhydride through a reaction under a nitrogen atmosphere at 130° C. to 180° C. After that, while distilling away reaction byproducts to the outside of the reaction system by raising the temperature, polycondensation is allowed in such a manner as to cause ester exchange among an acyl group of the acylated substances, and carboxyl groups of aromatic hydroxycarboxylic acid acylated substance and aromatic dicarboxylic acid, thereby obtaining a liquid crystal polyester.

A ratio between the phenolic hydroxide groups and the carboxyl groups in the mixture of aromatic hydroxycarboxylic acid, aromatic diol, and aromatic dicarboxylic acid may be preferably 0.9 to 1.1.

A usage amount of the fatty acid anhydride based on a sum of the phenolic hydroxyl groups in aromatic diol and aromatic hydroxycarboxylic acid may be preferably 0.95 to 1.20 equivalents, and more preferably 1.00 to 1.15 equivalents.

Coloring of a liquid crystal polymer to be obtained tends to be suppressed when the usage amount of the fatty acid anhydride is small, however, when the usage amount is too small, there is a tendency that non-reacted aromatic diol or aromatic dicarboxylic acid is easily sublimed to clog up a reactor or the like during polycondensation. On the other hand, in a case where the usage amount of the fatty acid anhydride exceeds 1.2 equivalents, coloring of a liquid crystal polymer to be obtained is prominent, and there is a risk of deterioration in color tone of a molded article.

Examples of the fatty acid anhydride include, but are not limited to acetic acid anhydride, propionic acid anhydride, butyric acid anhydride, isobutyric acid anhydride, valeric acid anhydride, pivalic acid anhydride, 2-ethylhexanic acid anhydride, monochloroacetic acid anhydride, dichloroacetic acid anhydride, trichloroacetic acid anhydride, monobromoacetic acid anhydride, dibromoacetic acid anhydride, tribromoacetic acid anhydride, monofluoroacetic acid anhydride, difluoroacetic acid anhydride, trifluoroacetic acid anhydride, glutaric acid anhydride, maleic acid anhydride, succinic acid anhydride, β-bromopropionic acid anhydride, and the like. Two or more kinds of these fatty acid anhydrides may be mixed for use. From the viewpoints of economic efficiency and handling property, it is preferable to use acetic acid anhydride, propionic acid anhydride, butyric acid anhydride, and isobutyric acid anhydride, and it is more preferable to use acetic acid anhydride.

The ester exchange (polycondensation) reaction may preferably be performed within a range of 130° C. to 400° C. while raising the temperature at a rate 0.1° C./min to 50° C./min, and more preferably within a range of 150° C. to 350° C. while raising the temperature at a rate of 0.3° C./min to 5° C./min.

In order to more smoothly perform the ester exchange (polycondensation) reaction, reaction byproducts may preferably be distilled away to the outside of the system.

The production method of the liquid crystal polymer may be performed in the presence of a heterocyclic organic base compound having two or more nitrogen atoms. With use of the heterocyclic organic base compound, smooth progress of the ester exchange (polycondensation) reaction is easily achieved, and there is the advantage of sufficiently suppressing the coloring of the liquid crystal polymer.

Examples of the heterocyclic organic base compound having two or more nitrogen atoms include an imidazole compound, a triazole compound, a dipyridylyl compound, a phenanthroline compound, a diazaphenanthrene compound, and the like. Among these, from the viewpoints of acylation and reactivity related to polycondensation, an imidazole compound is preferred, and 1-methylimidazole and 1-ethylimidazole are more preferred from the viewpoint of easy availability.

For the purpose of increasing a polycondensation rate by promoting the ester exchange (polycondensation) reaction, a catalyst other than the heterocyclic organic base compound may be used in combination. However, in the case of using a metal salt or the like as the catalyst, the metal salt remains in the liquid crystal polymer as impurity, and adverse affects can be exerted on production of electronic component parts such as an antenna in some cases. In view of this point, the use of the heterocyclic organic base compound is a particularly preferred embodiment for producing the liquid crystal polymer to be used for the component (A).

Examples of a method for further improving a polymerization degree of the liquid crystal polymer include a method of reducing a pressure inside a reactor during the ester exchange (polycondensation) reaction (polymerization under reduced pressure), a method of cooling and solidifying a reaction product after the ester exchange (polycondensation) reaction, pulverizing the reaction product into a powder, followed by solid phase polymerization of the thus-obtained powder at 250° C. to 350° C. for 2 to 20 hours, and the like. By improving the polymerization degree of the liquid crystal polymer by the polymerization method, the liquid crystal polymer having a preferred flow initiation temperature can be easily produced. In view of the simple equipment, it is preferable to employ the solid phase polymerization.

As described in the foregoing, in the case of performing the solid phase polymerization after the ester exchange (polycondensation), a powder obtained cooling and solidifying a polymer having a relatively low molecular weight obtained by the ester exchange (polycondensation) reaction (hereinafter referred to as prepolymer) and then pulverizing the polymer by various known pulverizing means is used. An average particle diameter of the powder may be preferably within the range of about 0.05 or more to 3 mm or less, and more preferably within the range of about 0.5 or more to 1.5 mm or less. Such ranges of the particle diameter of the powder are preferred since attainment of high polymerization degree of the liquid crystal polyester is much more promoted, and the range of 0.1 or more to 1.0 mm or less is further preferred since polymerization degree of the liquid crystal polymer can be increased without sintering between powder particles.

The solid phase polymerization can provide a higher molecular weight of the liquid crystal polymer as well as to obtain the liquid crystal polymer having a preferred flow initiation temperature (270° C. to 400° C.) in a relatively short time.

The acylation and the polycondensation by the ester exchange reaction may preferably be performed under an atmosphere of an inert gas such as nitrogen.

It is possible to introduce a specific amount or more of 2,6-naphthalenediyl groups into the liquid crystal polymer by appropriately optimizing, in the monomer to be used for producing the liquid crystal polymer, a usage amount ratio of the monomer that can be introduce the 2,6-naphthalenediyl groups selected from 2-hydroxy-6-naphthoeic acid, 2,6-naphthalenedicarboxylic acid, and 2,6-naphthalenediol based on the entire monomers.

<Filler Made of Composite Oxide of Component (B)>

A component (B) to be used in the present invention is a filler made of a composite oxide containing Ba, Sm, and Ti, and a solid solution containing other metal elements may be used as the filler insofar as the solid solution contains the three elements as main components. In this case, examples of the other metal elements include, La (lanthanum), Bi (bismuth), Nd (neodymium), Pr (praseodymium), and the like.

Here, a method for producing a composite oxide to be used for the component (B) will be briefly described.

For the production of composite oxide, a production method such as a solid phase method and a chemical synthesis method (gas phase method and liquid phase method, for example) are exemplified, and a solid phase method is advantageous since the method is simple in operation and enables to easily provide the composite oxide having a target composition. As a brief description of the solid phase method, the method includes mixing oxides or carbonate salts containing Ba, Sm, and Ti, respectively, and reacting the mixture under a high temperature. More specific examples of the method include a method of preparing oxides [barium oxide (BaO), samarium oxide ($Sm_2O_3$), and titanium oxide ($TiO_2$)]containing Ba, Sm, and Ti, respectively, mixing the oxides, and sintering the mixture or a method of mixing samarium ($Sm_2O_3$) with a mixture of barium carbonate ($BaCO_3$) and titanium oxide capable of generating $BaTiO_3$ and sintering the mixture. In the case of adding other metal elements to the composite oxide, a small amount of lanthanum oxide ($La_2O_3$), neodymium oxide ($Nd_2O_3$), niobium oxide ($Nb_2O_5$), and/or praseodymium oxide ($Pr_6O_{11}$) may be mixed with the oxides [barium oxide (BaO), samarium oxide ($Sm_2O_3$), and titanium oxide ($TiO_2$)], followed by sintering. A sintering temperature is 800° C. to 1200° C. and may appropriately be optimized depending on the types of raw materials such as the oxides to be used. In a solid phase reaction according to the solid phase method, the composite oxide can be easily a crude aggregate due to high temperature and long term sintering processing, and the aggregate is pulverized to obtain the composite oxide in a form of a powder. An optimum pulverizing method is selected among known pulverizing means depending on the type of the obtained composite oxide.

It is possible to obtain a filler to be used as the component (B) of the present invention, which has an average particle diameter of good miscibility with the liquid crystal polymer, by granulating or disintegrating and, if required, classifying the composite oxide obtained as described above. The filler may be preferably a filler having an average particle diameter of 0.1 to 100 μm which is measured by a laser spectroscopic particle diameter measurement, for example. In the case of using the filer as the component (B), the filler may have any one of a particulate shape, a plate-like shape, a needle-like shape, and the like, and an optimum filler shape can be selected depending on the type of the liquid crystal polymer to be used. However, the filler shape may be preferably the particulate shape from the viewpoint of easy filler production.

In order to further reduce the dielectric loss tangent of a molded article to be obtained, a content equivalent ratio between Ba and Sm (Ba/Sm) in the composite oxide may preferably satisfy $0<Ba/Sm \leq 1$, and more preferably $0.4<Ba/Sm \leq 1$.

In terms of attaining a high dielectric property of an article to be obtained, the filler to be used for the component (B) may preferably be made of a composite oxide having a dielectric constant of 50 or more to 200 or less, and more preferably 100 or more to 200 or less, which is measured under the conditions of a measurement temperature of 23° C. and a measurement frequency of 1 GHz. When the dielectric constant is below 50, a large improvement in dielectric constant in the molded article cannot be expected, and, in a case where the molded article is used as an antenna base, there is a tendency that it is difficult to downsize the antenna base. An upper limit of the dielectric constant may be preferably 200 or less from the practical point of view. For measurement of the dielectric constant, an impedance analyzer may be used.

A commercially available filler made of a composite oxide containing Ba, Sm, and Ti as main components and having a dielectric constant 50 to 200 can be used. Specific examples of the commercially available filler include "HF-120D" manufactured by KCM Corporation Co., Ltd.

In the resin composition of the present invention, it is possible to optimize a mixing ratio between the component (A) and the component (B) in such a manner that a molded article to be obtained has the desired dielectric constant. Depending on other properties (e.g. heat resistance, mechanical strength, etc.) according to usage of the molded article, the mixing ratio can be further adjusted, and a preferred mixing ratio will be described later. It is possible to calculate the mixing ratio from usage amounts and specific gravities of the component (A) liquid crystal polymer and the component (B) filler to be used, respectively.

In the case of using the filler as the component (B), the filler may be subjected to a surface treatment for the purpose of enhancing dispersibility of the filler to the liquid crystal polymer. A surface treatment agent is ordinarily used for the surface treatment. Known surface treatment agents are usable as the surface treatment agent, and examples thereof include a coupling agent such as a titanate-based coupling agent, an aluminum-based coupling agent, a silane-based coupling agent.

<Other Components>

The resin composition of the present invention may contain an additive such as a reinforcing agent depending on a required property within a range that does not impair the object of the present invention.

Examples of the additive include a fibrous reinforcing material such as a glass fiber, a silica-alumina fiber, an alumina fiber, and a carbon fiber; a needle-like reinforcing material such as an aluminum borate whisker and a potassium titanate whisker; an inorganic filler such as glass beads, talc, mica, graphite, wollastonite, and dolomite; a releasability improver such as a fluorine resin and metal soaps; a coloring agent such as a dye and a pigment; an antioxidant; a heat stabilizer; a UV absorber; an antistatic agent; a surfactant; and the like.

<Resin Composition>

The resin composition of the present invention is obtainable by mixing the component (A), the component (B), and other components such as the above-described additives as required.

As described above, it is necessary to set the mixing ratio between the component (A) and the component (B) in the resin composition of the present invention within a range where the desired dielectric characteristics are satisfactorily exhibited and where the properties required for the usage are not impaired. For the usage as an antenna base or the like, the component (A) may be preferably 50 to 90 vol%, and more preferably 50 to 80 vol % based on 100 vol % of a sum of the component (A) and the component (B) to be mixed.

Hereinafter, a method for preparing the resin composition of the present invention will be described.

In a preparation method for obtaining the resin composition of the present invention, a mixing means is not particularly limited insofar as the mixing means is capable of melt-kneading each of raw material components. Specific examples of the method include a method of supplying the component (A), the component (B), and further other components to be added if required separately to a melt-mixer, a method of supplying the raw material components to a melt-mixer after preliminarily mixing the raw material components in a mortar, a henschel mixer, a ball mill, a ribbon blender, or the like. By such melt-kneading (heat-melting), the resin composition is formed into a heat-molten article.

It is possible to appropriately optimize a temperature condition in melt-kneading by setting the flow initiation temperature Tp [° C.] of the component (A) liquid crystal polymer to be used as a base point. The temperature condition may be preferably within the range of Tp-10[° C.] or more to Tp+100[° C.] or less, more preferably within the range of Tp-10[° C.] or more to Tp+70[° C.] or less, and particularly preferably within the range of Tp-10[° C.] or more to Tp+50[° C.] or less. In the case of using two or more types of liquid crystal polymers as the component (A), a flow initiation temperature Tp[° C.] of a mixture of the two or more types of liquid crystal polymer is determined by the above method, and the flow initiation temperature Tp[° C.] is used as the base point.

It is possible to produce the heat-molten article of the resin composition obtained by the melt-kneading into composition pellets (strand method) by a series of operations of forming the heat-molten article into a strand by extrusion in the form of a string by a uniaxial or multi-axial extruder, preferably by a biaxial extruder, a bunbury mixer, a roll mixer, or the like, cooling and solidifying the strand for cutting. It is also possible to employ a hot-cut method in which the strand obtained as described above is cut to process the strand into pellets by a dice cutter immediately after the injection of the strand from a die of the extruder without cooling and solidifying the strand. However, when the strand method and the hot-cut method are compared from the viewpoint of productivity, the strand method achieves good productivity and, therefore, is advantageous.

As described above, the preparation method of the composition pellets using the uniaxial or biaxial extruder is easy in operation since the method enables continuous operation from the melt-kneading to the pelletizing.

<Liquid Composition>

The liquid composition of the present invention is obtainable by a step of dissolving the component (A) into a solvent and a step of dispersing the component (B) and other components such as the additives as required into the solution.

The solvent to be used for the liquid composition of the present invention is not particularly limited insofar as the solvent dissolves the liquid crystal polymer, and, in the case of dissolving aromatic liquid crystal polyester having the above-described structural units, a solvent containing 30 wt % or more of a halogen-substituted phenol compound represented by the following general formula (I) may preferably be used since the solvent is capable of dissolving aromatic liquid crystal polyester at a relatively low temperature at an ambient temperature or under heating.

From the viewpoint of capability of dissolving aromatic liquid crystal polyester at a relatively low temperature, a solvent containing 60 wt % or more of the halogen-substituted phenol compound (I) is more preferred, and a solvent containing 100 wt % or more of the halogen-substituted phenol compound (I) is further preferred since the solvent does not require to be mixed with other components.

In the formula, A represents a halogen atom or a trihalogenated-methyl group; and i represents an integer of 1 to 5; and when i is an integer of 2 or more, a plurality of A may be the same or different from one another, a plurality of A are preferably the same.

Examples of the halogen atom include a fluorine atom, a chlorine atom, a bromine atom, and an iodine atom, among which the fluorine atom and the chlorine atom are preferred.

Examples of the compound represented by the formula (I) in which the halogen atom is a fluorine atom include pentafluorophenol, tetrafluorophenol, and the like.

Examples of the general formula (I) in which the halogen atom is a chlorine atom include o-chlorophenol and p-chlorophenol, and p-chlorophenol is preferred from the viewpoint of solubility.

In a case where the liquid crystal polymer is liquid crystal polyesteramide containing the above-described structural units, since the liquid crystal polyesteramide exhibits sufficient solubility to aprotic solvent that does not contain a halogen atom, such an aprotic solvent is suitably used.

Examples of the aprotic solvent that does not contain a halogen atom include an ether-based solvent such as diethyl-ether, tetrahydrofuran, and 1,4-dioxane; a ketone-based solvent such as acetone and cyclohexanone; an ester-based solvent such as ethyl acetate; a lactone-based solvent such as γ-butyrolactone; a carbonate-based solvent such as ethylene carbonate and propylene carbonate; an amine-based solvent such as triethylamine and pyridine; a nitrile-based solvent such as acetonitrile and succinonitrile; an amide-based solvent such as N,N-dimethylformamide, N,N-dimethylacetoamide, tetramethylurea, and N-methylpyrrolidone; a nitro-based solvent such as nitromethane and nitrobenzene; a sulfur-based solvent such as dimethylsulfoxide and sulfolane; and a phosphor-based solvent such as hexamethylphosphoric amide and tri-n-butyl phosphate. The solubility of the liquid crystal polyester to solvents mentioned above means that the liquid crystal polyester is soluble to at least one selected from the above-listed aprotic solvents.

From the viewpoints of better solvent solubility of the liquid crystal polyesteramide and easy production of the liquid composition, it is preferable to use the aprotic polar solvent among the above-listed solvents, which has a dipole moment of 3 or more to 5 or less. Among these, the amide-based solvent and the lactone-based solvent are preferred, and N,N'-dimethylformamide (DMF), N,N'-dimethylacetoamide (DMAc), and N-methyl-2-pyrrolidone (NMP) are more preferred. Further, when the solvent is a high volatile solvent having a boiling point of 180° C. or less at one atmospheric pressure, it is preferable since the solvent facilitates production of the molded article described later, and in view of such a characteristic, the use of DMF or DMAc is particularly preferred.

Components other than the halogen-substituted phenol compound may be contained in the solvent to be used in the present invention insofar as the components do not allow aromatic liquid crystal polyester to precipitate during storage of the solution or casting described later.

Examples of the components that can be contained include, but are not limited to, a chlorine-based compound such as chloroform, methylene chloride, and tetrachloroethane.

The aromatic liquid crystal polyester component (A) is 0.5 to 100 parts by weight based on 100 parts by weight of the solvent. When the aromatic liquid crystal polyester component (A) is less than 0.5 part by weight, solution viscosity is so low that it is impossible to perform uniform coating in some cases. From the viewpoints of workability or economic efficiency, a range of 1 to 50 parts by weight is preferred, and a range of 2 to 10 parts by weight is more preferred.

The aromatic liquid crystal polyester solution obtained as describe above may be subjected to a step of filtration using a filter as required to remove very small contaminants contained in the solution.

As described above, it is necessary to set the mixing ratio between the component (A) and the component (B) in the liquid composition of the present invention within a range where the desired dielectric characteristics are satisfactorily exhibited and where the properties required for the usage are not impaired. For the usage as an antenna base or the like, the component (A) may be preferably 50 to 90 vol%, and more preferably 50 to 80 vol % based on 100 vol % of a sum of the component (A) and the component (B) to be mixed.

<Molded Article and Antenna Base>

The resin composition thus obtained is applicable to various molding methods and casting methods to provide molded articles including film. Examples of the molding methods include melt-molding such as injection molding and press molding, and injection molding is preferred. Specific examples of the injection molding include ordinary injection molding, injection compression molding, two-color molding, sandwich molding, and, among these, ordinary injection molding and injection compression molding are preferred. The resin composition has a characteristic of capable of suppressing particularly the mold shrinkage factor in the TD direction during molding. Therefore, the resin composition enables to easily provide a molded article having desired dimension and, in the case of producing a component part by providing the obtained molded article with a metal layer, it is possible to favorably suppress generation of warping in the component part.

As a method for producing a film using a liquid composition of the present invention, it is possible to obtain the film by casting the liquid composition on a metal foil so uniformly as to achieve a flat surface by a means such as a roller coating method, a dip coating method, a spray coating method, a spinner coating method, a slot coating method, and a screen printing method, followed by removing the organic solvent.

The molded article to be obtained by using the resin composition of the present invention reflects the high dielectric property exhibited by the component (B) and exhibits excellent dielectric characteristics of achieving enormously small dielectric loss tangent. Particularly, the molded article to be obtained from the resin composition of the present invention achieves a dielectric loss tangent of 0.01 or less which is measured under the conditions of a measurement temperature of 23° C. and a measurement frequency of 1 MHz.

The resin composition of the present invention is particularly useful for producing an antenna base due to the above characteristics.

Hereinafter, an antenna to be obtained by using the resin composition of the present invention will be briefly described.

It is possible to produce an antenna by allowing an antenna base to be obtained using the resin composition of the present invention to form into an electrode (radiation electrode, ground electrode, etc.) by performing etching and the like if required. As a means for forming a conductive layer serving as the electrode, a known method such as metal plating, sputtering, ion plating, vacuum vapor deposition, soldering, and the like is employed. A metal foil formed into a desired electrode shape may be adhered or pressure-bonded using an adhesive or the like, or a metal foil may be adhered or pressure-bonded to the surface of a molded article, followed by patterning of the adhered or pressure-bonded metal foil so as to have a desired shape.

The antenna thus obtained is more easily downsized as compared to the conventional antenna due to enormously excellent dielectric characteristics of the antenna base. An antenna obtained from the antenna base is particularly suitably used for wireless LAN such as Bluetooth, mobile phone and PHS or mobile appliances, GPS (global positioning system), ETC (electric toll collection system), satellite communication, and the like.

Since properties of the liquid crystal polymer such as high mechanical strength and high heat resistance are satisfactorily maintained in the antenna obtained by using the resin composition of the present invention, it is excellent in durability against an external environment. Therefore, it is suitably used as an antenna for outdoor installation. Further, due to the effect of the downsizing achieved by the excellent dielectric characteristics, the antenna is also enormously excellent as an automotive antenna and a mobile phone antenna.

The invention being thus described, it will be apparent that the same may be varied in many ways. Such variations are to be regarded as within the spirit and scope of the invention, and all such modifications as would be apparent to one skilled in the art are intended to be within the scope of the following claims.

EXAMPLES

The present invention is described in more detail by following Examples, which should not be construed as a limitation upon the scope of the present invention. Measurement Method (Method for Measuring Flow Initiation Temperature A sample in an amount of about 2 g was charged into a capillary rheometer to which a die having a diameter of 1 mm and a length of 10 mm was attached by using a flow tester ("Type CFT-500", manufactured by Shimadzu Corporation). A temperature at which a melt-viscosity became 4800 Pa·s (48000 pois) when a molten article was extruded out from a nozzle under a load of 9.8 MPa (100 kg/cm$^2$) and a temperature increase rate of 4° C./min was determined as the flow initiation temperature.

Synthesis Example 1

(Production of Liquid Crystal Polyester)

In a reactor provided with a stirrer, a torque meter, a nitrogen gas introduction tube, a temperature meter, and a reflux condenser, 1034.99 g (5.5 mol) of 2-hydroxy-6-naphthoeic acid, 272.52 g (2.475 mol, excessive feeding of 0.225 mol) of hydroquinone, 378.33 g (1.75 mol) of 2,6-naphthalenedicarboxylic acid, 83.07 (0.5 mol) of terephthalic acid, 1226.87 g (12.0 mol) of acetic acid anhydride, and 0.17 g of 1-methylimidazole (catalyst) were added, followed by stirring at a room temperature for 15 minutes, and then the temperature was raised with stirring. When an inside temperature reached 145° C., the temperate was maintained for one hour with stirring.

Next, the temperature was raised from 145° C. to 310° C. over 3 hours and 30 minutes while distilling away the distilled byproduct acetic acid and non-reacted acetic acid anhydride. The temperature of 310° C. was maintained for 3 hours to obtain liquid crystal polyester. The obtained liquid crystal polyester was cooled to room temperature and pulverized by a pulverizer to obtain a powder (prepolymer) of the liquid crystal polyester having a particle diameter of about 0.1 to 1 mm. A flow initiation temperature of the prepolymer determined by using a flow tester was 267° C.

After obtaining a powder by pulverizing the prepolymer, the powder prepolymer was heated from 25° C. to 250° C. over one hour and then heated from 250° C. to 293° C. over 5 hours, followed by solid phase polymerization by keeping 293° C. for 5 hours. Liquid crystal polyester was obtained by cooling, and a flow initiation temperature of the liquid crystal polyester determined by using a flow tester was 317° C. A content of 2,6-naphthalenediyl groups based on a sum of entire aromatic groups in the liquid crystal polyester was 72.5 mol %.

Example 1

The liquid crystal polyester obtained by Synthesis Example 1 and "HF-120D" manufactured by KCM Corporation Co., Ltd. (content equivalent ratio of Ba and Sm, Ba/Sm=0.8 to 0.9) were mixed in the proportion (volumetric ratio) shown in Table 1 and pelletized by using a biaxial extruder ("PCM-30", manufactured by Ikegai Iron Works Co., Ltd.) at a melting temperature of 340° C. by the strand method, thereby obtaining composition pellets.

Evaluation of Dielectric Characteristics:

After drying the obtained pellets at 120° C. for 3 hours, a resin substrate having a size of 64 mm×64 mm×1 mm was obtained as a sample by using an injection molding machine (Type PS40E5ASE, manufactured by Nissei Plastic Industrial Co., Ltd.) at a cylinder temperature of 350° C. and a metal mold temperature of 130° C., and dielectric characteristics were evaluated by using an HP impedance analyzer under the conditions of a measurement temperature of 23° C. and a measurement frequency of 1 GHz. The results are shown in Table 1.

Evaluation of Dimension Stability:

After drying the obtained pellets at 120° C. for 3 hours, a flat plate test piece having a size of 64 mm×64 mm×3 mm was obtained by using an injection molding machine (Type PS40E5ASE, manufactured by Nissei Plastic Industrial Co., Ltd.) at a cylinder temperature of 350° C. and a metal mold temperature of 130° C., and the dimension of each side was measured. From a metal mold dimension calculated as an average value of each side in the orientation direction (MD direction) of the resin at the melt-molding and in the direction (TD direction) orthogonal to the MD direction, shrinkage amounts in the MD direction and the TD direction were calculated, respectively. The shrinkage amounts were expressed by percentage as change amounts based on the metal mold dimensions. The results are shown in Table 1.

Comparative Example 1

Various characteristics were evaluated in the same manner as in Example 1 except for using "NPO-S" (composite oxide containing Ba, Nd, and Ti as main components) manufactured by Fuji Titanium Industry, Co., Ltd. in place of "HF-120D". The results are shown in Table 1.

TABLE 1

|  | Example 1 | Comparative Example 1 |
|---|---|---|
| Component (A) liquid crystal polyester | Synthesis Example 1 | Synthesis Example 1 |
| Component (A) powder flow initiation temperature (° C.) | 317 | 322 |
| Filler to be used | HF-120D | NPO-S |
| Content of liquid crystal polyester in composition (vol %) | 81 | 81 |
| Content of Filler component in composition (vol %) | 19 | 19 |
| Content of Filler component in composition (weight %) | 50 | 50 |
| Granulation temperature (° C.) | 340 | 340 |
| Molding temperature (° C.) | 345 | 350 |
| Mold shrinkage factor MD (%) | 0.14 | 0.42 |
| Mold shrinkage factor TD (%) | 1.17 | 1.42 |
| Dielectric loss tangent (1 GHz) | 0.009 | 0.009 |

Synthesis Example 2

In a reactor provided with a stirrer, a torque meter, a nitrogen gas introduction tube, a temperature meter, and a reflux condenser, 941 g (5.0 mol) of 2-hydroxy-6-naphthoeic acid, 466 g (2. 5 mol) of 4,4-dihydroxybiphenyl, 415 g (2.5 mol) of isophthalic acid, and 1123 g (11.0 mol) of acetic acid anhydride were fed. After sufficiently substituting the inside of the reactor with a nitrogen gas, a temperature was raised to 150° C. over 15 minutes under a nitrogen flow, followed by reflux for 3 hours while maintaining the temperature.

After that, the temperature was raised to 320° C. while distilling away distilled byproduct acetic acid and non-reacted acetic acid anhydride over 170 minutes, and a time point at which an increase in torque was observed was considered as termination of the reaction, followed by withdrawal of the content. The content was cooled to room temperature and pulverized by a pulverizer to obtain a powder. A flow initiation temperature of the powder was 229° C. The powder was subjected to a heating treatment at 264° C. for 3 hours in a nitrogen atmosphere for solid phase polymerization. Thus, liquid crystal polyester was obtained. A flow initiation temperature of the liquid crystal polyester was 303° C.

The thus-obtained liquid crystal polyester (27 g) was added to 273 g of p-chlorophenol (PCP), followed by heating at 120° C. for 8 hours to obtain a resin solution 1. A solution viscosity of the resin solution was 7000 cP. The solution viscosity was a value measured by using a B type viscometer ("Type TVL-20" manufactured by Toki Sangyo Co., Ltd.), Rotor No. 23 (revolution: 10 rpm), at a measurement temperature of 50° C.

Example 2

The obtained resin solution 1 and "HF-120D" manufactured by KCM Corporation Co., Ltd. (content equivalent ratio of Ba and Sm, Ba/Sm=0.8 to 0.9) were mixed in the proportion (volumetric ratio) shown in Table 2 to obtain a solution composition 1. The solution composition 1 was coated on a copper foil [3EC-VLP (18 μm) manufactured by Mitsui Mining & Smelting Co., Ltd.] by bar coating, and a heat treatment was performed at 100° C. for one hour and 320° C. for three hours to form a film on the copper foil. The entire copper foil was then removed by using a ferric chloride solution (Baume: 40°; manufactured by Kida Co., Ltd.) to obtain a film. A thickness of the thus-obtained film was 20 μm.

Evaluation of Dielectric Characteristics:

Gold vapor deposition was performed on the obtained resin film to form an electrode, and dielectric characteristics were evaluated by using an LCR meter manufactured by Agilent under the conditions of a measurement temperature of 23° C. and a measurement frequency of 20 Hz to 1 MHz.

Evaluation of Dimension Stability:

A linear expansion coefficient of the obtained film was measured in accordance with JIS C6481 "Method for Testing Copper Clad Laminate for Printed Wiring Board" by using a TMA device (manufactured by SII) within a temperature range of 100° C. to 150° C. The unit was ppm/° C.

Comparative Example 2

Various characteristics were evaluated in the same manner as in Example 2 except for using "NPO-S" (composite oxide containing Ba, Nd, and Ti as main components) manufactured by Fuji Titanium Industry, Co., Ltd. in place of "HF-120D". The results are shown in Table 2.

TABLE 2

| | | Example 2 | Comparative Example 2 |
|---|---|---|---|
| Component (A) liquid crystal polyester | | Synthesis Example 2 | Synthesis Example 2 |
| Component (A) powder flow initiation temperature (° C.) | | 317 | 322 |
| Filler to be used | | HF-120D | NPO-S |
| Content of liquid crystal polyester in solution composition (vol %) | | 7.5 | 7.5 |
| Content of solvent in solution composition (vol %) | | 85 | 85 |
| Content of filler component in solution composition (vol %) | | 7.5 | 7.5 |
| Linear expansion coefficient (100° C. to 150° C.) | MD | $0.58 \times 10^{-5}$ | $1.11 \times 10^{-5}$ |
| | TD | $0.47 \times 10^{-5}$ | $1.09 \times 10^{-5}$ |
| Dielectric loss tangent (1 MHz) | | <0.001 | <0.001 |

What is claimed is:

1. A resin composition comprising
   (A) a liquid crystal polymer and
   (B) a filler comprising a composite oxide containing Ba, Sm, and Ti.

2. The resin composition according to claim 1, wherein the component (B) is a filler comprising a composite oxide having a dielectric constant of 50 to 200 which is determined under the conditions of a measurement temperature of 23° C. and a measurement frequency of 1 GHz.

3. The resin composition according to claim 1, wherein the component (A) is a liquid crystal polyester in which divalent aromatic groups are bonded by ester bonding and containing 30 mol % or more of 2,6-naphthalenediyl groups when a sum of all of the divalent aromatic groups forming the polyester is 100 mol %.

4. The resin composition according to claim 1, wherein the component (A) is a polyesteramide in which divalent aromatic groups are bonded by ester bonding and amide bonding and containing 30 mol % or more of 2,6-naphthalenediyl groups when a sum of all of the divalent aromatic groups forming the polyesteramide is 100 mol %.

5. The resin composition according to claim 1, wherein the component (A) is a liquid crystal polyester which has a structural unit represented by formula (i), a structural unit represented by formula (ii) and a structural unit represented by formula (iii), respectively shown below, and which contains 30 mol % or more of 2,6-naphthalenediyl groups when a sum of a divalent aromatic group represented by $Ar_1$, a divalent aromatic group represented by $Ar_2$ and a divalent aromatic group represented by $Ar_3$ is 100 mol %:

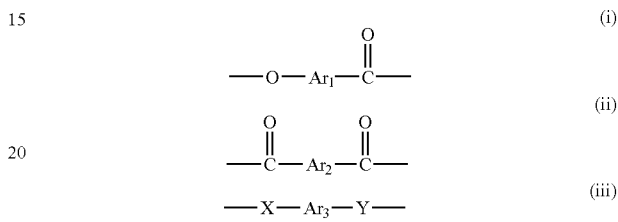

wherein $Ar_1$ represents a divalent aromatic group selected from the group consisting of a 2,6-naphthalenediyl group, a 1,4-phenylene group and a 4,4'-biphenylene group; $Ar_2$ and $Ar_3$ each independently represents a divalent aromatic group selected from the group consisting of a 2,6-naphthalenediyl group, a 1,4-phenylene group, a 1,3-phenylene group and a 4,4'-biphenylene group; X and Y each independently represents O or NH; and, in each of the aromatic groups represented by $Ar_1$, $Ar_2$ and $Ar_3$, a part of hydrogen atoms bonded to an aromatic ring may be substituted with a halogen atom, an alkyl group having 1 to 10 carbon atoms or an aryl group having 6 to 20 carbon atoms.

6. The resin composition according to claim 1, wherein the content of the component (A) is 50 to 80 vol % based on 100 vol % of a sum of the component (A) and the component (B).

7. A liquid composition comprising the resin composition of claim 1 and a solvent.

8. A molded article obtained from the resin composition of claim 1.

9. The molded article according to claim 8, wherein the molded article has 0.01 or less of a dielectric loss tangent determined under the conditions of a measurement temperature of 23° C. and a measurement frequency of 1 MHz.

10. A film obtainable by coating the liquid composition of claim 7 on a substrate and removing the solvent from the composition.

11. The film according to claim 10, wherein the film has 0.01 or less of a dielectric tangent loss determined under the conditions of a measurement temperature of 23° C. and a measurement frequency of 1 MHz.

12. An antenna comprising the molded article of claim 8 and an electrode.

13. An antenna comprising the film of claim 10 and an electrode.

* * * * *